R. & P. J. BROWNSON.
HORSE COLLAR STUFFING MACHINE.
APPLICATION FILED SEPT. 30, 1908.
966,079.
Patented Aug. 2, 1910.
2 SHEETS—SHEET 2.
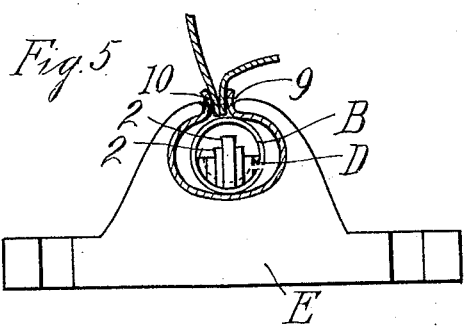
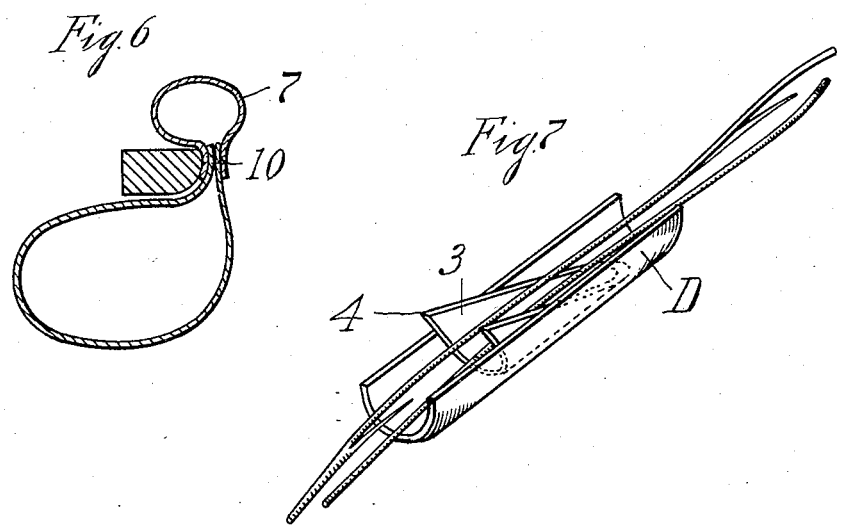
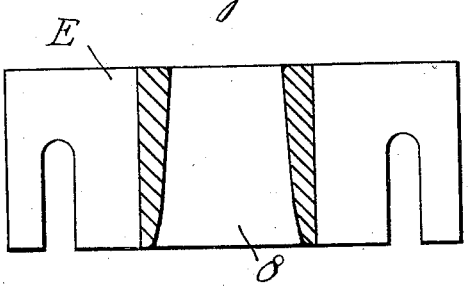
Witnesses,
George Voelker
Hattie Smith
Inventors,
Ralph Brownson
Percy J. Brownson
by Lothrop & Johnson
their Attorneys.

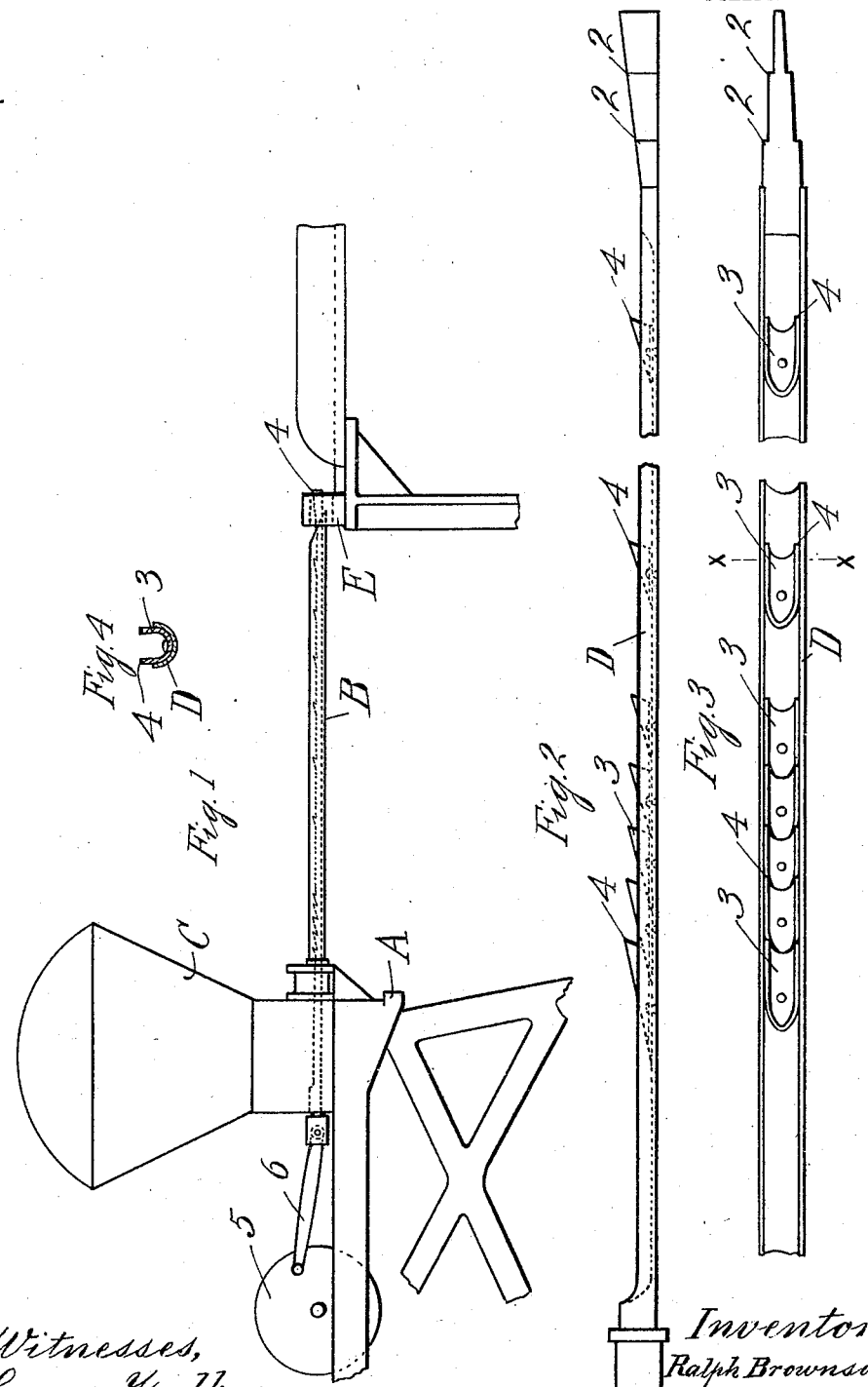

UNITED STATES PATENT OFFICE.

RALPH BROWNSON AND PERCY J. BROWNSON, OF ST. PAUL, MINNESOTA.

HORSE-COLLAR-STUFFING MACHINE.

966,079.  Specification of Letters Patent.  Patented Aug. 2, 1910.

Application filed September 30, 1908. Serial No. 455,399.

*To all whom it may concern:*

Be it known that we, RALPH BROWNSON and PERCY J. BROWNSON, citizens of the United States, residing at St. Paul, in the county of Ramsey and State of Minnesota, have invented certain new and useful Improvements in Horse-Collar-Stuffing Machines, of which the following is a specification.

Our invention relates to improvements in horse collar stuffing machines, its object being to provide a combined mold and stuffing device for a horse collar rim whereby the rim will be properly shaped as it is being stuffed, and which will permit the use of long straw in stuffing.

In the accompanying drawings forming part of this specification, Figure 1 is a side elevation of the stuffing machine; Fig. 2 is a side elevation of the stuffing plunger, shown partly broken away; Fig. 3 is a top view of the same; Fig. 4 is a cross section on line $x$—$x$ of Fig. 3; Fig. 5 is an end view of the mold with the collar rim in section; Fig. 6 is a sectional view of a collar and hame; Fig. 7 is a perspective view of part of the stuffing plunger, and Fig. 8 is a horizontal section through the mold.

In the drawings A represents the framework of the machine. Supported by the framework is a feed tube B with which is connected a hopper C for the supply of straw. Slidable within the feed tube is a trough like plunger D preferably semi-circular in cross section. The forward end of the plunger terminates in a plurality of stepped teeth 2 progressively reduced in width and extended upwardly at their outer ends as shown in Fig. 2. Arranged within the plunger are a plurality of hollowed or trough shaped teeth 3, preferably curved as shown in Fig. 7, and formed with forwardly and upwardly extending twin points 4. By reason of the form of the teeth long straws can be fed through the feed tube and thoroughly packed. The plunger is shown actuated by means of an eccentric 5 and rod 6.

E represents a mold formed with a narrowing passage 8 to receive and shape the rim of the collar, and a slotted neck 9 at the top to receive the collar neck 10. With the rim of the collar fitted into the mold as indicated in Fig. 5, and the tube B extending into the rim, the plunger, when reciprocated by the eccentric 5, will carry the straw from the hopper C through the tube and into the rim. As the rim is packed by the plunger it will be forced out of the narrowed end of the mold and be shaped in cross section by the curved walls of the mold passage 8.

By reason of the improved form of hollowed tooth and plunger shown longer straw can be used in this machine than in the ordinary stuffing apparatus. And by reason of the plunger and coöperating mold the collar rim is tightly packed and properly shaped in cross section, and the extra work necessary to be done in shaping the rim in the ordinary way of filling is avoided. Besides, a smaller amount of leather is required to make the rim than where the filling is not so firmly stuffed as it is with the present construction.

We claim:

1. In an apparatus of the class described, a filling tube, a plunger semicircular in cross section slidable therein, and a plurality of teeth semicircular in cross section secured in said plunger.

2. In an apparatus of the class described, a trough shaped plunger slidable therein and a plurality of trough shaped teeth fitted within said plunger and having their side walls extending upwardly and rearwardly.

3. In an apparatus of the class described, a mold formed with a tapered mold passage, a trough shaped filling tube extending into the larger end of said passage and a plurality of trough shaped teeth secured within said plunger.

In testimony whereof we affix our signatures in presence of two witnesses.

RALPH BROWNSON.
PERCY J. BROWNSON.

Witnesses:
ARTHUR P. LOTHROP,
HATTIE SMITH.